Oct. 24, 1950 — H. W. LEVERENZ — 2,527,365
DOUBLY ACTIVATED INFRARED PHOSPHORS
Filed May 22, 1945

INVENTOR.
Humboldt W. Leverenz
BY Charles McClair
ATTORNEY

Patented Oct. 24, 1950

2,527,365

UNITED STATES PATENT OFFICE 2,527,365

DOUBLY ACTIVATED INFRARED PHOSPHORS

Humboldt W. Leverenz, Princeton, N. J., assignor to Radio Corporation of America, a corporation of Delaware Application May 22, 1945, Serial No. 595,146

8 Claims. (Cl. 252—301.4)

This invention relates to phosphors or detectors for infrared light.

Provision has heretofore been made for use of infrared radiation for detecting and observing objects in the dark, as well as in daylight through intervening fog, clouds or other medium not penetrable by light in the visible spectrum.

A phosphor material heretofore developed for rendering infrared ray images visible is strontium sulphide activated with europium and samarium, corresponding to the general formula, SrS:Eu:Sm This material has been molded into a "button" for use in a suitable optical system, such as the well-known Schmidt system. This phosphor material, for a long time after excitation by ultra-violet light or blue light ceases, will again become luminescent and emit orange light when stimulated by infrared emanation.

It is an object of my invention to increase the efficiency of visibility of the light emitted by phosphors when stimulated by infrared rays.

Another object of the invention is to displace the emission spectra of a phosphor stimulated by infrared rays toward shorter wave lengths.

Another object is to provide a phosphor stimulatable by infrared rays that emits light in the yellow part of the spectrum.

Other objects will appear in the following description, reference being had to the drawing, in which.

Figure 1:
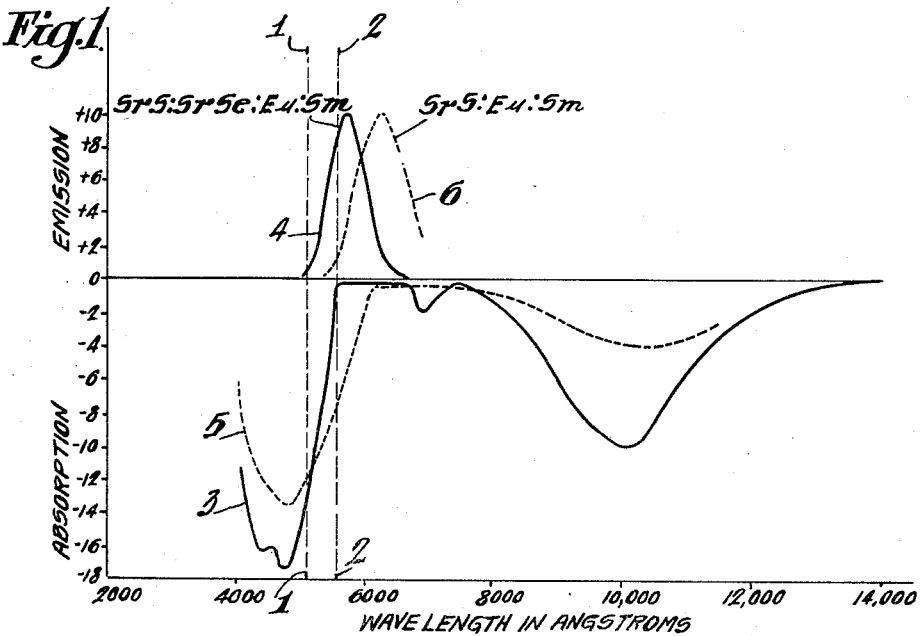
Fig. 1 is a series of graphs showing the absorption and emission effects of phosphor upon excitation by ultra-violet and blue light and stimulation by infrared energy.

In my experiments I have found that replacing part of the sulphur in the prior art phosphor material SrS:Eu:Sm by selenium produces a marked improvement in visibility, as the emission spectrum of the resultant phosphor after infrared stimulation is displaced to shorter wave lengths, that is, from red-orange towards yellow-green and displacement increases with the proportionate amount of selenium introduced into the resultant phosphor up to about 80% strontium selenide with activators of samarium and europium, or terbium, or combinations of them. This results in up to about a five-fold increase in efficiency of visibility, since the phosphor's emission color is brought nearer the maximum spectral sensitivities of both the light-adapted and the dark-adapted eye.

The resultant phosphor of my improvement may be symbolized essentially as $x$SrS:$y$SrSe:Eu:Sm where $x$ and $y$ indicate proportions, and the result obtained by my invention will become apparent by referring to the drawing. Terbium may be substituted for either europium or samarium, or used together with them. In the drawing, 1 and 2 indicate the peaks of sensitivity of a dark-adapted eye and a light-adapted eye, respectively. These peaks are at wave lengths of about 5100 Å. and 5560 Å., respectively.

From these peaks the visibility decreases for both longer and shorter wave lengths. Curve 3 of the drawing indicates the absorption of light and infrared energy by the improved phosphor. The first part of curve 3 centering around 4750 Å. indicates the energy observed from light in the blue band. While the blue light is exciting the phosphor it will emit light. This is called fluorescence. When the excitation by blue light is removed the phosphor continues to emit light called phosphorescence, for a brief period but the light rapidly decays to substantially zero as far as the eye can determine. With my improved phosphor, the light of fluorescence, as well as the light of phosphorescence is shown by curve 4 which gives the light emitted at various wave lengths. Curve 3 shows absorption of energy by my phosphor for all wave lengths between 4000 Å. and 14,000 Å. However, only the absorbed energy of wave lengths between substantially 4000 Å. and 5000 Å. will cause the phosphor to emit light in substantial quantity. The energy absorbed from wave lengths above 5000 Å. causes substantially no visible emission. The energy absorbed from wave lengths between 4000 Å. and 5000 Å. is not all immediately released by fluorescence and phosphorescence. Considerable absorbed energy remains trapped in the phosphor and is released so slowly that the eye cannot distinguish it. Absorbed radiant energy of about 10,000 Å. to 10,500 Å., which is infrared, causes the energy released by the blue light and trapped in the phosphor, to be released quickly and further phosphorescence occurs. The infrared energy will not of itself excite the phosphor to fluorescence. It will only cause the trapped energy to be released. Thus, curve 3 shows the radiant energy that my improved phosphor absorbs at various wave lengths, and curve 4 shows the light emitted from the energy absorbed from the blue light, or through stimulation.

In the prior art phosphor of activated strontium sulphide alone, the absorption and stimulation effects are shown by curve 5 and the emission of light after excitation by blue light and subsequent stimulation by infrared energy is shown by curve 6.

An inspection of these curves at once shows that the emission of light by infrared stimulation with my improved phosphor is shifted markedly towards the sensitivity peaks for the dark-adapted and light-adapted eye, making it decidedly more useful in observing objects that are invisible by light rays.

Figure 2:
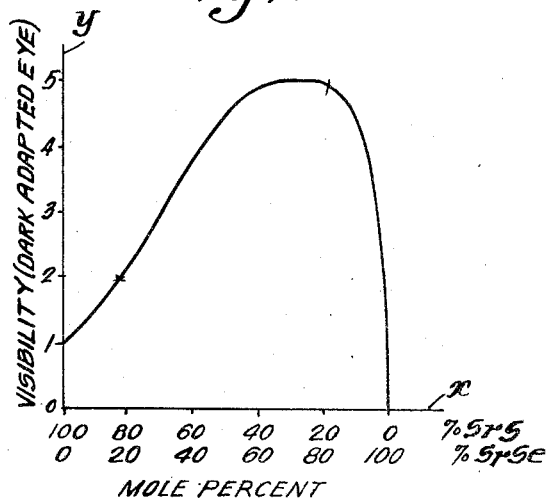
Fig. 2 illustrates the improved visibility of the phosphor of my invention by use of varying proportions of the sulphides and selenides of strontium.

In Fig. 2 the curve indicates the luminous efficiency or visibility at constant infrared input at about 10,500 A. for a dark-adapted eye, with varying proportions in mole per cent of sulphide and selenide of strontium, with europium and samarium activators. At point 0, where the phosphor consists entirely of the sulphide, the visibility for a dark-adapted eye is taken as 1 on the ordinate scale. At the point 1 in the abscissas, where the ratio of sulphide to selenide is 80% to 20%, the visibility is doubled and as the sulphide is displaced by selenide, the visibility increases rapidly to about 50% sulphide and 50% selenide. Maximum sensitivity is reached, with 20% sulphide and 80% selenide. From this point, the visibility decreases with the increase of selenide, but visibility is still improved over the prior art phosphor until only a small per cent of sulphide remains, but after that the efficiency of the material drops to practically zero. It will be noted from Fig. 2 of the drawing that with 98 mole percent strontium selenide and 2 mole percent strontium sulphide the visibility is the same as with 20 mole percent strontium selenide and 80 mole percent strontium sulphide which visibility is twice the visibility of the phosphor having 100 percent strontium sulphide and no strontium selenide. The visibility increase covers a wide range of proportions and the improvement is not restricted to a particular compound or mixture, but the following may be given as one example of the initial ingredients in preparing the phosphor:

| 1 | 2 | 3 | 4 | 5 |
|---|---|---|---|---|
| Initial ingredient | Molecular or atomic weight | Grams | Moles | Mole per cent |
| $SrCO_3$ | 147.64 | 5.0031 | 0.033887 | 29.44340 |
| S | 32.06 | 1.3000 | 0.040549 | 35.23181 |
| Se | 78.96 | 3.2000 | 0.040527 | 35.21270 |
| Eu [1] | 150.00 | 0.0100 | 0.000066 | 0.05735 |
| Sm (or Tb [1]) | 159.20 | 0.0100 | 0.000063 | 0.05474 |
| Total number of moles | | | 0.115092 | 100.00000 |

[1] Added as sulfate, viz., $Eu_2(SO_4)_3$ and $Tb_2(SO_4)_3$.

The strontium carbonate is wetted with a water solution containing the europium and samarium (or terbium) as soluble salts, sulphates in the example given. The mixture is stirred and dried and then further mixed with the chosen mixture of powdered sulphur and selenium and then heated at about 1100° C. for 10 to 30 minutes in an inert or reducing atmosphere such as carbon bisulphide, hydrogen sulphide, nitrogen or hydrogen. The heated mass is removed from the furnace, cooled, preferably in the same atmosphere in order to prevent oxidation, and reground with a small amount of flux, such as $CaF_2$ and a further quantity of powdered sulphur. The excess sulphur added prevents uncontrollable oxidation from occluded oxygen when the mixture is being prepared and heated in the furnace. This mixture is then molded by mild compression into a "button" or other suitable shape for use in a Schmidt optical system, for example. The button is then reheated at a somewhat lower temperature, viz. 800 to 1000° C., for a suitable length of time in a non-oxidizing atmosphere such as described. After removal from the furnace and cooling, the phosphor is ready for use in the optical system.

In the above example the initial ingredients are given and the final product may contain, in addition to the co-crystallized material such as sulphur and selenium initially added in excess, calcium and fluorine initially added as a flux, and oxygen initially added as carbonate, selenite, selenate, sulphite or sulphate, in variable quantities.

Modifications of this preparation procedure may be made, for example, by starting out directly with strontium sulphide and strontium selenide in the desired proportions, to which the activators europium and samarium or terbium and a flux of $CaF_2$ may be added. This will yield intrinsically the same final product, which is a strontium sulpho-selenide activated by two or more of the rare earths. Further modifications include starting with activated and fluxed selenites, selonates, sulphites, and/or sulphates of strontium, which may be effectively reduced to strontium sulpho-selenide by heating in an atmosphere containing hydrogen, carbon disulphide, hydrogen sulphide, carbon monoxide, sulphur, or nitrogen.

Calcium, barium, beryllium and magnesium may be substituted in whole or in part for the strontium without departing from the spirit of the invention, but beryllium is the least useful of these elements.

It will be apparent that variations may be made in the concentration and kinds of fluxes, heating temperature, time and atmosphere, and in the cooling procedure and atmosphere.

Having described my invention, what I claim is:

1. A phosphor material adapted to be stimulated by infra red wave energy consisting of substantially 80 to 20 mole percent strontium sulphide and 20 to 80 mole percent strontium selenide co-crystallized in combination with europium and samarium in activator proportions.

2. A phosphor material adapted to be stimulated by infra red wave energy after excitation by shorter wave energy, consisting of 80 to 20 mole percent sulphide and 20 to 80 mole percent selenide of metals from the group consisting of strontium, calcium, barium, beryllium and magnesium in combination with at least two members in activator proportions from the group consisting of europium, samarium and terbium, said sulphides and selenides being co-crystallized.

3. A phosphor material adapted to be stimulated by infra red wave energy after excitation by shorter wave energy, consisting of 80 to 20 mole percent strontium sulphide and 20 to 80 mole percent strontium selenide co-crystallized in combination with at least two members in activator proportions from the group consisting of europium, samarium and terbium.

4. A phosphor material adapted to be stimulated by infra-red wave energy after excitation by shorter wave energy, consisting of 80 mole percent to 2 mole percent strontium sulphide and 20 mole percent to 98 mole percent strontium selenide, said compounds being co-crystallized and having activators of europium and samarium in activator proportions.

5. A phosphor material adapted to be stimulated by infra-red wave energy after excitation by shorter wave energy, consisting of 80 mole percent to 2 mole percent of the sulphide and 20 mole percent to 98 mole percent of the selenide of metals from the group consisting of strontium, calcium, barium, beryllium and magnesium, said compounds being co-crystallized, and having at least two metals in activator proportions from the group consisting of europium, samarium and terbium.

6. A phosphor material adapted to be stimulated by infra-red wave energy after excitation by shorter wave energy consisting of 80 mole percent to 2 mole percent strontium sulphide and 20 mole percent to 98 mole percent strontium selenide, said compounds being co-crystallized and having two metals in activator proportions from the group consisting of europium, samarium and terbium.

7. An infra-red phosphor composition, consisting essentially of strontium selenide, about 3% by weight of strontium sulfide and having as activators, europium and samarium in activator proportions.

8. An infra-red phosphor composition consisting essentially of a fused mixture which consists essentially of a member of the group consisting of the selenides of calcium and strontium, an alkaline earth compound containing an anion component selected from the group consisting of $F^-$, $SO_4^{--}$, $S^{--}$, and $O^{--}$ and activating proportions of a double activator consisting of samarium-europium.

HUMBOLDT W. LEVERENZ.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,074,226 | Kunz | Mar. 16, 1937 |
| 2,372,071 | Fernberger | Mar. 20, 1945 |